(12) United States Patent
Chen et al.

(10) Patent No.: US 11,611,253 B2
(45) Date of Patent: Mar. 21, 2023

(54) ROTOR OF MOTOR AND AUTOMOBILE

(71) Applicant: Huawei Digital Power Technologies Co., Ltd., Shenzhen (CN)

(72) Inventors: Jun Chen, Dongguan (CN); Fei Bian, Dongguan (CN); Quanming Li, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/460,002

(22) Filed: Aug. 27, 2021

(65) Prior Publication Data
US 2021/0391762 A1     Dec. 16, 2021

Related U.S. Application Data

(63) Continuation of application No. PCT/CN2020/072314, filed on Jan. 15, 2020.

(51) Int. Cl.
*H02K 1/32* (2006.01)
*H02K 9/19* (2006.01)
*B60K 1/00* (2006.01)

(52) U.S. Cl.
CPC .............. *H02K 1/32* (2013.01); *H02K 9/19* (2013.01); *B60K 1/00* (2013.01)

(58) Field of Classification Search
USPC .......................................... 310/54, 60 R, 61
See application file for complete search history.

(56) References Cited

U.S. PATENT DOCUMENTS

| 7,994,668 B2* | 8/2011 | Gerstler | H02K 9/197 310/216.057 |
| 8,080,908 B2 | 12/2011 | Matsubara et al. | |
| 8,970,074 B2* | 3/2015 | Wagner | H02K 7/003 310/59 |

(Continued)

FOREIGN PATENT DOCUMENTS

| CN | 101305510 A | 11/2008 |
| CN | 101755376 A | 6/2010 |

(Continued)

OTHER PUBLICATIONS

Machine translation of DE 102013020332 A1, Year 2014, German Patent Office (Year: 2014).*

*Primary Examiner* — Ahmed Elnakib
*Assistant Examiner* — Minki Chang
(74) *Attorney, Agent, or Firm* — Womble Bond Dickinson (US) LLP

(57) ABSTRACT

This application provides a rotor of a motor, including: a rotating shaft, provided with at least one first liquid outlet; a first end plate, disposed on an outer wall of the rotating shaft and perpendicular to the rotating shaft, where an inlet of at least one third passageway is provided on the first end plate; a second end plate, disposed on the outer wall of the rotating shaft and perpendicular to the rotating shaft, where an outlet of the at least one third passageway is provided on the second end plate; and a plurality of lamination sheets, disposed between the first end plate (103) and the second end plate, where at least one second through hole on each of the plurality of lamination sheets forms the at least one third passageway.

10 Claims, 7 Drawing Sheets

(56) References Cited

U.S. PATENT DOCUMENTS

| | | | |
|---|---|---|---|
| 2004/0080218 A1 | 4/2004 | Weidman et al. | |
| 2018/0375395 A1 | 12/2018 | Yamagishi | |
| 2020/0036250 A1* | 1/2020 | Krais | H02K 7/003 |
| 2020/0227964 A1* | 7/2020 | Ronning | H02K 7/116 |

FOREIGN PATENT DOCUMENTS

| | | | |
|---|---|---|---|
| CN | 103081312 A | 5/2013 | |
| CN | 103283129 A | 9/2013 | |
| CN | 104838567 A | 8/2015 | |
| CN | 106100186 A | 11/2016 | |
| CN | 206922591 U | 1/2018 | |
| CN | 108377047 A | 8/2018 | |
| CN | 109149825 A | 1/2019 | |
| CN | 110212670 A | 9/2019 | |
| DE | 102013020332 A1 | 7/2014 | |
| DE | 102013020332 A1 * | 7/2014 | H02K 1/32 |
| JP | S56071050 U | 6/1981 | |
| JP | S61088467 U | 6/1986 | |
| JP | 2000083351 A | 3/2000 | |
| JP | 2010239799 A | 10/2010 | |
| JP | 2012161134 A | 8/2012 | |
| JP | 2012165620 A | 8/2012 | |
| JP | 5017120 B2 | 9/2012 | |
| JP | 2015056966 A | 3/2015 | |
| JP | 2017125580 A | 7/2017 | |
| WO | 2013136405 A1 | 9/2013 | |
| WO | 2017018067 A1 | 2/2017 | |

* cited by examiner

ROTOR OF MOTOR AND AUTOMOBILE

CROSS-REFERENCE TO RELATED APPLICATIONS

This application is a continuation of International Application No. PCT/CN2020/072314, filed on Jan. 15, 2020, the disclosure of which is hereby incorporated by reference in its entirety.

TECHNICAL FIELD

This application relates to the field of motors, and more specifically, to a rotor of a motor and an automobile having the rotor of the motor.

BACKGROUND

Drive motors of new energy vehicles have advantages such as high power densities, high operating efficiency, and wide speed adjustment ranges, and therefore are widely used in industrial applications such as new energy vehicles.

In recent years, as the field of new energy vehicles constantly strives for high power densities and high rotational speeds of drive motors, copper loss densities of motor windings and iron loss densities of stator and rotor cores are relatively high, and an excessively high motor temperature causes problems such as burnout of windings and demagnetization of rotor magnetic steels. Therefore, it is necessary to cool rotors of motors.

In a conventional technical solution, a plurality of lamination sheets that have different structures and that are nested on a rotating shaft of a rotor are stacked to form a passageway of coolant. Because the plurality of lamination sheets that are nested on the rotating shaft of the rotor have different structures, complexity and implementation costs are increased.

SUMMARY

This application provides a rotor of a motor. A plurality of lamination sheets on the rotor of the motor have a same structure, mold costs and production costs are relatively low, and coolant in a single layer of passageways, double layers of passageways, or a plurality of layers of passageways of the rotor can be used for cooling.

According to a first aspect, a rotor of a motor is provided, including: a rotating shaft provided with at least one first liquid outlet;

a first end plate, disposed on an outer wall of the rotating shaft and perpendicular to the rotating shaft, where an inlet of at least one third passageway is provided on the first end plate, and the inlet of the at least one third passageway is in communication with the at least one first liquid outlet of the rotating shaft; a second end plate, disposed on the outer wall of the rotating shaft and perpendicular to the rotating shaft, where an outlet of the at least one third passageway is provided on the second end plate and is configured to drain coolant from the third passageway, and the coolant enters the at least one third passageway through the first liquid outlet of the rotating shaft and is drained through the outlet of the at least one third passageway; and a plurality of lamination sheets, disposed between the first end plate and the second end plate, where at least one second through hole is provided on each of the plurality of lamination sheets, and the at least one second through hole on each lamination sheet forms the at least one third passageway.

In an embodiment of the first aspect, the coolant in the at least one third passageway is drained through the outlet of the at least one third passageway and then flows into the rotating shaft.

In an embodiment of the first aspect, at least one third through hole is further provided on each of the plurality of lamination sheets, and the at least one third through hole on each lamination sheet forms at least one fourth passageway. An inlet of the at least one fourth passageway is further provided on the second end plate). The inlet of the at least one fourth passageway is in communication with the outlet that is of the at least one third passageway and that is on the second end plate (104) and is configured to guide the coolant in the at least one third passageway into the at least one fourth passageway. An outlet of the at least one fourth passageway is further provided on the first end plate and is configured to drain the coolant from the at least one fourth passageway. The coolant enters the at least one fourth passageway from the at least one third passageway through the outlet of the at least one third passageway and is drained through the outlet of the at least one fourth passageway.

In another possible implementation of the first aspect, the coolant in the at least one fourth passageway is drained through the outlet of the at least one fourth passageway and then flows into the rotating shaft.

In another possible implementation of the first aspect, at least one fourth through hole is further provided on each of the plurality of lamination sheets, and the at least one fourth through hole on each lamination sheet forms a fifth passageway. An inlet of at least one fifth passageway is provided on the second end plate. At least one second liquid outlet is further provided on the rotating shaft. The inlet of the at least one fifth passageway is in communication with the at least one second liquid outlet of the rotating shaft. An outlet of the at least one fifth passageway is further provided on the first end plate and is configured to drain coolant from the at least one fifth passageway. The coolant enters the at least one fifth passageway through the at least one second liquid outlet of the rotating shaft and is drained through the outlet of the at least one fifth passageway.

In another possible implementation of the first aspect, the coolant in the at least one fifth passageway is drained through the outlet of the at least one fifth passageway and then flows into the rotating shaft.

In another possible implementation of the first aspect, at least one fifth through hole is further provided on each of the plurality of lamination sheets, and the at least one fifth through hole on each lamination sheet forms at least one sixth passageway. An inlet of the at least one sixth passageway is further provided on the first end plate (103). The inlet of the at least one sixth passageway is in communication with the outlet that is of the fifth passageway and that is on the first end plate and is configured to guide the coolant in the fifth passageway into the at least one sixth passageway. An outlet of the at least one sixth passageway is further provided on the second end plate and is configured to drain the coolant from the at least one sixth passageway. The coolant enters the at least one sixth passageway from the at least one fifth passageway through the outlet of the at least one fifth passageway and is drained through the outlet of the at least one sixth passageway.

In another possible implementation of the first aspect, the coolant in the at least one sixth passageway is drained through the outlet of the at least one sixth passageway and then flows into the rotating shaft.

In another possible implementation of the first aspect, one or more of the following are evenly distributed around the rotating shaft: the at least one third passageway, the inlet of the at least one third passageway, the outlet of the at least one third passageway, the at least one second through hole, and the at least one first liquid outlet.

In another possible implementation of the first aspect, the rotor of the motor further includes: a flow distribution apparatus, having a hollow structure and located in the rotating shaft. Fastening components are disposed at two ends of an outer wall of the flow distribution apparatus and the flow distribution apparatus is connected to two ends of an inner wall of the rotating shaft by using the fastening components. At least one first through hole is provided on a side wall of the flow distribution apparatus. An opening is provided at one end of the flow distribution apparatus. A first passageway is formed between the opening and the at least one first through hole. A baffle plate is disposed between the at least one first through hole in the flow distribution apparatus and an end opposite to the first passageway (106). A second passageway is formed between the outer wall of the flow distribution apparatus and the inner wall of the rotating shaft (101), and the at least one first through hole is configured to connect the first passageway to the second passageway. The at least one first liquid outlet of the rotating shaft is in communication with the second passageway and is configured to drain coolant from the second passageway.

In another possible implementation of the first aspect, the at least one first liquid outlet of the rotating shaft is in communication with the second passageway and is configured to drain coolant from the second passageway. The coolant flows into the second passageway through the first passageway on the rotating shaft and flows into the at least one third passageway through the at least one first liquid outlet.

In another possible implementation of the first aspect, the fastening components are annular protrusions.

In another possible implementation of the first aspect, the fastening components further include sealing rings.

In another possible implementation of the first aspect, a reinforcing component is disposed on the outer wall of the flow distribution apparatus, and the reinforcing component is configured to connect to outer walls that are on two sides of the at least one first through hole that is on the flow distribution apparatus.

In another possible implementation of the first aspect, the reinforcing component is a long-strip-shaped protrusion.

In another possible implementation of the first aspect, a flow disturbing component is further disposed on the outer wall of the flow distribution apparatus.

In another possible implementation of the first aspect, the flow disturbing component is a spherical protrusion.

In another possible implementation of the first aspect, the flow disturbing component is in a helical shape.

In another possible implementation of the first aspect, the baffle plate is located at an end that is of the flow distribution apparatus and that is opposite to the first passageway (106).

In another possible implementation of the first aspect, heights of the fastening components are adjusted, so that a distance between the flow distribution apparatus and the second passageway is adjusted to change.

According to a second aspect, a motor is provided, including: a stator of the motor and the rotor of the motor according to any one of the first aspect and the possible implementations of the first aspect.

According to a third aspect, a powertrain is provided, including the rotor of the motor according to any one of the first aspect and the possible implementations of the first aspect.

According to a fourth aspect, an automobile is provided, including the rotor of the motor according to any one of the first aspect and the possible implementations of the first aspect.

DESCRIPTION OF EMBODIMENTS

The following describes technical solutions of this application with reference to accompanying drawings.

It should be noted that, in the embodiments of this application, orientation or position relationships indicated by terms "center", "above", "below", "left", "right", "vertical", "horizontal", "inner", "outer", and the like are based on orientation or position relationships shown in the accompanying drawings, and are merely intended for conveniently describing the embodiments of this application and simplifying descriptions, rather than indicating or implying that an apparatus or element in question needs to have a particular orientation, or needs to be constructed and operated in a particular orientation, and therefore cannot be understood as a limitation on the embodiments of this application. In addition, terms "first", "second", and "third" are merely intended for a descriptive purpose, and cannot be understood as indicating or implying relative importance.

In addition, it should be further noted that, in descriptions of the embodiments of this application, unless otherwise expressly specified and limited, terms "mount", "interconnect", and "connect" should be understood in a broad sense. For example, the terms may indicate a fixed connection, a detachable connection, or an integral connection, or may be a mechanical connection or an electrical connection, or may be a direct connection or an indirect connection through an intermediate medium, or may be communication in two elements. A person skilled in the art may understand specific meanings of the terms in the embodiments of this application based on specific situations.

Figure 1:
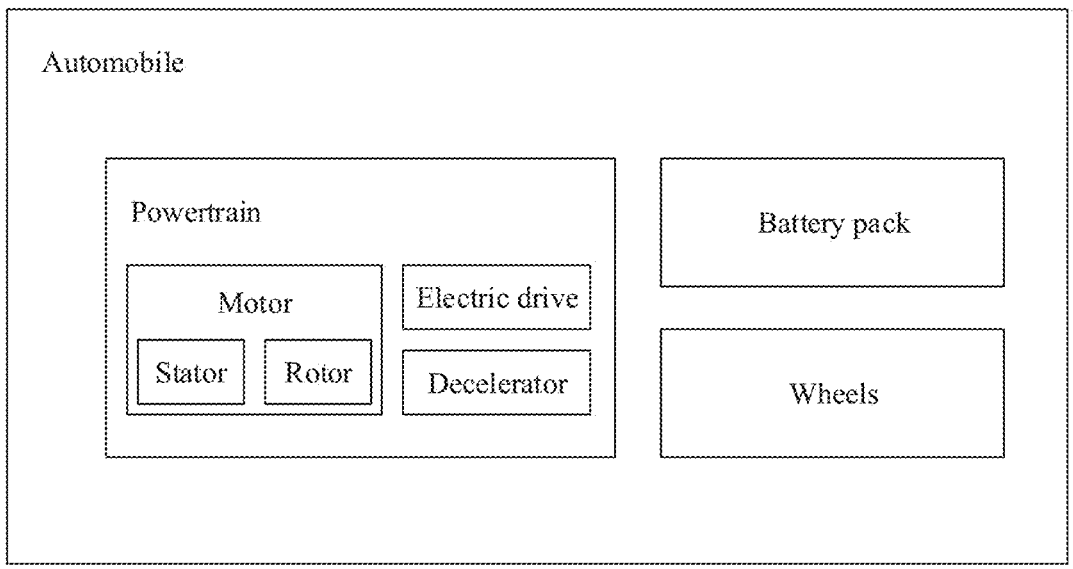
FIG. 1 is a schematic structural diagram of an automobile according to an embodiment of this application.

The following first describes a structure of an automobile with reference to FIG. 1.

FIG. 1 is a schematic structural diagram of an automobile according to an embodiment of this application. As shown in FIG. 1, the automobile may include: one or more powertrains, a battery pack, and wheels.

The powertrain may include: a motor, an electric drive, and a decelerator. The motor is an apparatus for conversion between electric energy and mechanical energy, and includes two parts: a stator and a rotor. The stator of the motor is a stationary part of the motor, includes three parts: a stator core, a stator winding, and a base, and mainly functions to generate a rotating magnetic field. The rotor of the motor is a rotating part of the motor, and mainly functions to be cut by a magnetic line in the rotating magnetic field to generate a (output) current.

Drive motors of automobiles (for example, new energy vehicles) have advantages such as high power densities, high operating efficiency, and wide speed adjustment ranges, and therefore are widely used in industrial applications such as new energy vehicles. According to cooling modes of drive motors, cooling structures may mainly include an air cooling structure, a water cooling structure, and an oil cooling structure. In recent years, as the field of new energy vehicles constantly strives for high power densities and high rotational speeds of drive motors, copper loss densities of motor windings and iron loss densities of stator and rotor cores are relatively high, and an excessively high motor temperature causes problems such as burnout of windings and demagnetization of rotor magnetic steels. Therefore, it is necessary to cool rotor and stator windings of the motor.

In a conventional technical solution, a plurality of lamination sheets that have different structures and that are nested on a rotating shaft of a rotor are stacked to form a passageway of coolant. Because the plurality of lamination sheets that are nested on the rotating shaft of the rotor have different structures, complexity and implementation costs are increased.

In a rotor of a motor provided in the embodiments of this application, a plurality of lamination sheets on the rotor of the motor can have a same structure, mold costs and production costs can be relatively low, and coolant in a single layer of passageways, double layers of passageways, or a plurality of layers of passageways of the rotor can be used for cooling.

Figure 2:
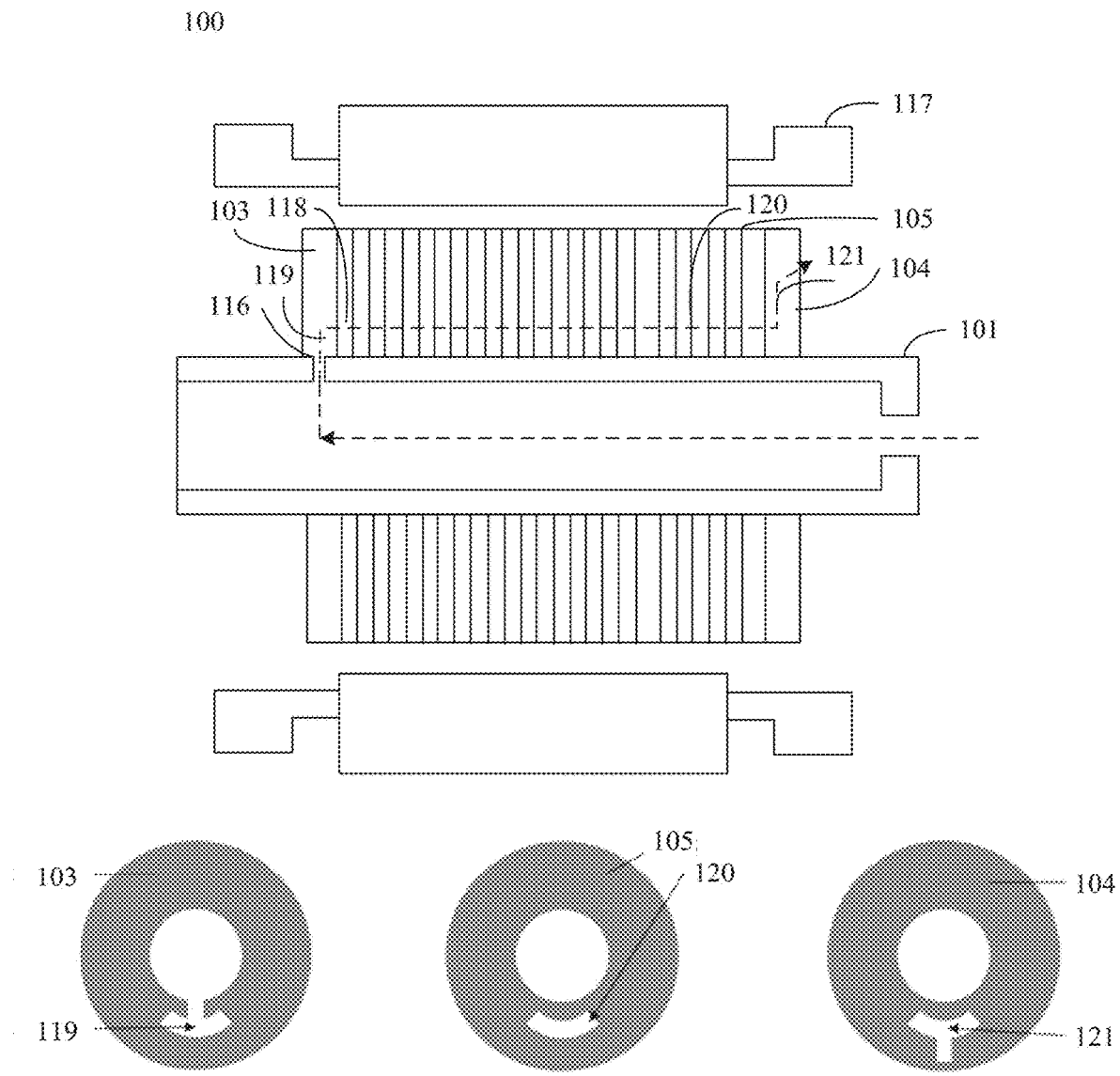
FIG. 2 is a schematic structural diagram of a rotor 100 of a motor according to an embodiment of this application.

The following describes in detail a rotor of a motor according to an embodiment of this application with reference to FIG. 2.

FIG. 2 is a schematic structural diagram of a rotor 100 of a motor according to an embodiment of this application. As shown in FIG. 2, the rotor 100 of the motor may include: a rotating shaft 101, a first end plate 103, a second end plate 104, and a plurality of lamination sheets 105.

The rotating shaft 101 may be a hollow rotating shaft. An opening is provided on one side of the rotating shaft 101 to help guide coolant into the rotating shaft 101.

The first end plate 103 and the second end plate 104 are disposed on two sides of an outer wall of the rotating shaft 101, and are perpendicular to a flow direction of the coolant in the rotating shaft 101. The plurality of lamination sheets 105 are stacked together, and are disposed on the outer wall of the rotating shaft 101. The plurality of lamination sheets 105 are perpendicular to the flow direction of the coolant in the rotating shaft 101, and are disposed between the first end plate 103 and the second end plate 104.

It should be understood that the lamination sheets 105 may be silicon steel sheets. This is not limited in this application.

At least one first liquid outlet 116 is provided on the outer wall of the rotating shaft 101. An inlet 119 of at least one third passageway 118 is provided on the first end plate 103. A position of the inlet 119 of the at least one third passageway 118 is opposite to a position of the at least one first liquid outlet 116, so that the coolant enters the rotating shaft 101 and then flows into the inlet 119 that is of the at least one third passageway 118 and that is on the first end plate 103 through the at least one first liquid outlet 116 on the outer wall of the rotating shaft 101. At least one second through hole 120 is provided on each of the plurality of lamination sheets 105, and second through holes 120 on all of the plurality of lamination sheets 105 are stacked together to form the at least one third passageway 118. The inlet 119 that is of the at least one third passageway 118 and that is on the first end plate 103 is in communication with the at least one third passageway 118, and is configured to guide the coolant that flows in the rotating shaft 101 into the at least one third passageway 118 through the at least one first liquid outlet 116 of the rotating shaft 101. An outlet 121 of the at least one third passageway 118 is provided on the second end plate 104. The outlet 121 of the at least one third passageway 118 is in communication with the at least one third passageway 118, and is configured to drain the coolant that flows in the at least one third passageway 118. The drained coolant may be recycled through a circulating loop. Specifically, the drained coolant may flow into the rotating shaft (101) through the circulating loop for recycling.

It should be understood that "at least one" described above may be one or more. This is not limited in this application. For ease of description, in FIG. 2, one second through hole 120 is provided on each of the plurality of lamination sheets 105, the plurality of lamination sheets 105 are stacked together to form one third passageway 118, the inlet 119 of one third passageway 118 is provided on the first end plate 103, and the outlet 121 of one third passageway 118 is provided on the second end plate 104.

In FIG. 2, the coolant enters the rotating shaft 101, and the coolant in the rotating shaft 101 is guided into the inlet 119 that is of the third passageway 118 and that is on the first end plate 103 through the first liquid outlet 116 provided on the outer wall of the rotating shaft 101. The coolant enters the third passageway 118 through the inlet 119 that is of the third passageway 118 and that is on the first end plate 103 and is drained through the outlet 121 that is of the third passageway 118 and that is on the second end plate 104. The drained coolant may be recycled through a circulating loop. Specifically, the drained coolant may flow into the rotating shaft (101) through the circulating loop for recycling.

In some embodiments, a position of the outlet 121 that is of the third passageway 118 and that is on the second end plate 104 may be opposite to a position of an end winding 117 of a stator, so that the coolant in the third passageway 118 may be sprayed onto a surface of the end winding 117 of the stator through the outlet 121 of the third passageway 118, and cools a stator winding, to reduce a copper loss density of a motor winding. The coolant sprayed onto the surface of the end winding 117 of the stator may also be recycled through a circulating loop.

It should be noted that a perforation position of the outlet 121 that is of the third passageway 118 and that is on the second end plate 104 is not limited in this embodiment of this application. The second end plate 104 may be perforated in a direction perpendicular to the flow direction of the coolant in the rotating shaft 101, or may be perforated at a particular angle to the flow direction of the coolant in the rotating shaft 101. For example, the perforation position of the outlet 121 that is of the third passageway 118 and that is on the second end plate 104 may be in a direction that is 45 degrees to the flow direction of the coolant in the rotating shaft 101.

In this embodiment of this application, shapes of the inlet 119 that is of the at least one third passageway 118 and that is on the first end plate 103, the outlet 121 that is of the at least one third passageway 118 and that is on the second end plate 104, and the at least one second through hole 120 of the plurality of lamination sheets 105 may be different from each other. This is not limited in this application provided that the coolant that flows in the rotating shaft 101 may flow into the at least one third passageway 118 through the inlet 119 of the at least one third passageway 118 and may be drained through the outlet 121 of the at least one third passageway 118. The drained coolant may be recycled through a circulating loop. Specifically, the drained coolant may flow into the rotating shaft (101) through the circulating loop for recycling.

The at least one third passageway 118 formed by the inlet 119 of the at least one third passageway 118, the outlet 121 of the at least one third passageway 118, and the at least one second through hole 120 of the plurality of lamination sheets 105 may be distributed around the rotating shaft 101. Preferably, the at least one third passageway 118 formed by the inlet 119 of the at least one third passageway 118, the outlet 121 of the at least one third passageway 118, and the at least one second through hole 120 of the plurality of lamination sheets 105 may be evenly distributed around the rotating shaft 101.

In this application, the at least one second through hole 120 provided on the plurality of lamination sheets 105 may be a straight through hole or may be a helical hole. A cross-section shape of the hole may be, for example, any one or a combination of a round hole, an elliptical hole, a rhombus hole, a slotted hole, and the like.

In some embodiments, to better cool the rotor of the motor, the coolant may flow in two cross directions in a plurality of passageways, so that the rotor is better cooled by using bidirectional cross cooling of the coolant in the plurality of passageways.

For example, in this embodiment of this application, structures of the first end plate 103 and the second end plate 104 may be the same. During mounting, one of the first end plate 103 and the second end plate 104 may be mounted on one side of the outer wall of the rotating shaft 101, and the other of the first end plate 103 and the second end plate 104 may be mounted on the other side of the outer wall of the rotating shaft 101 in a mirroring manner and rotated by a fixed angle for staggering.

Figure 3:
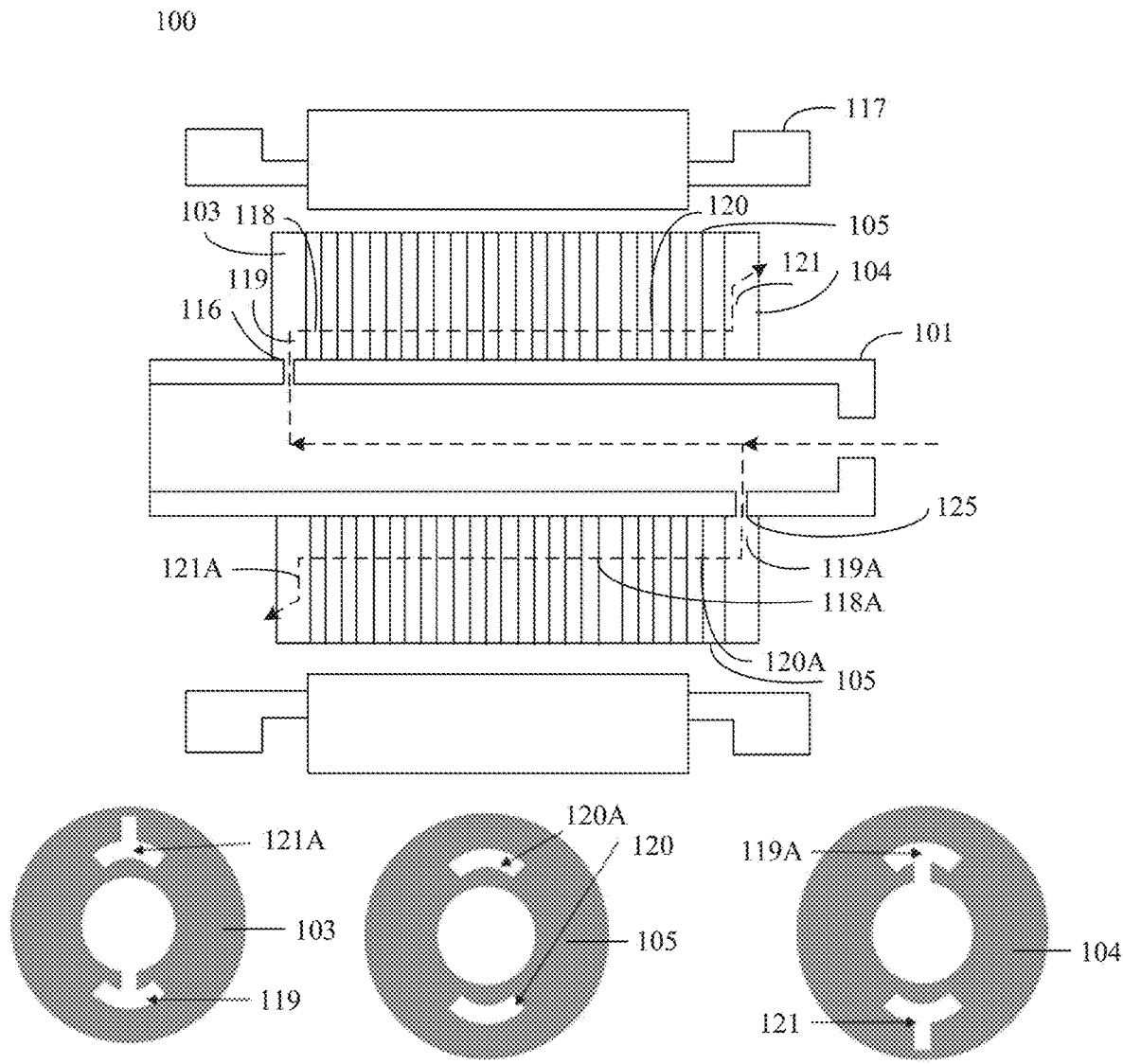
FIG. 3 is a schematic structural diagram of another rotor 100 of a motor according to an embodiment of this application.

Based on the embodiment shown in FIG. 2, at least one fourth through hole 120A is further provided on each of the plurality of lamination sheets 105. As shown in FIG. 3, fourth through holes 120A on all of the plurality of lamination sheets 105 are stacked together to form at least one fifth passageway 118A. An outlet 121A of the at least one fifth passageway 118A is further provided on the first end plate 103, and an inlet 119A of the at least one fifth passageway 118A is further provided on the second end plate 104. At least one second liquid outlet 125 is further provided on the rotating shaft 101. The at least one second liquid outlet 125 is in communication with the inlet 119A that is of the at least one fifth passageway 118A and that is on the second end plate 104, and is configured to guide the coolant that flows in the rotating shaft 101 into the at least one fifth passageway 118A.

For ease of description, in FIG. 3, for example, one second through hole 120 and one fourth through hole 120A are provided on each of the plurality of lamination sheets 105, second through holes 120 of all of the plurality of lamination sheets 105 are stacked together to form one third passageway 118, fourth through holes 120A of all of the plurality of lamination sheets 105 are stacked together to form one fifth passageway 118A, the inlet 119 of one third passageway 118 and the outlet 121A of one fifth passageway 118A are provided on the first end plate 103, and the outlet 121 of one third passageway 118 and the inlet 119A of one fifth passageway 118A are provided on the second end plate 104.

Referring to FIG. 3, for the first end plate 103, a relationship between positions of the inlet 119 of the third passageway 118 and the outlet 121A of the fifth passageway 118A that are provided on the first end plate 103 is not limited in this application. For example, in FIG. 3, the positions of the inlet 119 of the third passageway 118 and the outlet 121A of the fifth passageway 118A on the first end plate 103 may be spaced by 180 degrees on the first end plate 103. Similarly, for the second end plate 104, a relationship between positions of the outlet 121 of the third passageway 118 and the inlet 119A of the fifth passageway 118A that are provided on the second end plate 104 is not limited in this application. For example, in FIG. 3, the positions of the outlet 121 of the third passageway 118 and the inlet 119A of the fifth passageway 118A that are provided on the second end plate 104 may be spaced by 180 degrees on the second end plate 104. For each of the plurality of lamination sheets 105, a relationship between positions of the second through hole 120 and the fourth through hole 120A that are provided on the lamination sheet 105 is not limited in this application. For example, in FIG. 3, the positions of the second through hole 120 and the fourth through hole 120A may be spaced by 180 degrees on the lamination sheet 105.

During mounting, the second end plate 104 may be rotated by 360/n=360/2=180 degrees, where n represents a quantity of holes provided on the first end plate 103 or the second end plate 104. For example, in FIG. 3, the inlet 119 of one third passageway 118 and the outlet 121A of one fifth passageway 118A are provided on the first end plate 103, where n=2.

As shown in FIG. 3, the second through holes 120 of all of the plurality of lamination sheets 105 are stacked together to form one third passageway 118. The inlet 119 that is of the third passageway 118 and that is provided on the first end plate 103 and the outlet 121 that is of the third passageway 118 and that is provided on the second end plate 104 are separately in communication with the third passageway 118, so that the coolant is guided into the third passageway 118 from the inlet 119 of the third passageway 118 and flows through the third passageway 118, and the coolant in the third passageway 118 is drained through the outlet 121 that is of the third passageway 118 and that is provided on the second end plate 104. The fourth through holes 120A of all of the plurality of lamination sheets 105 are stacked together to form one fifth passageway 118A. The inlet 119A that is of the fifth passageway 118A and that is provided on the second end plate 104 and the at least one second liquid outlet 125 of the rotating shaft 101 are configured to guide the coolant that flows in the rotating shaft 101 into the fifth passageway 118A through the at least one second liquid outlet 125, and the coolant is drained through the outlet 121A that is of the fifth passageway 118A and that is on the first end plate 103. The drained coolant may be recycled through a circulating loop. Specifically, the drained coolant may flow into the rotating shaft (101) through the circulating loop for recycling.

In FIG. 3, the coolant may enter the rotating shaft 101 through an opening on one side of the rotating shaft 101. On one hand, the first liquid outlet 116 provided on the outer wall of the rotating shaft 101 guides the coolant in the rotating shaft 101 into the inlet 119 that is of the third passageway 118 and that is on the first end plate 103, and the coolant in the rotating shaft 101 enters the third passageway 118 through the inlet 119 that is of the third passageway 118 and that is on the first end plate 103 and is drained through the outlet 121 that is of the third passageway 118 and that is on the second end plate 104. On the other hand, the at least one second liquid outlet 125 provided on the outer wall of the rotating shaft 101 guides the coolant in the rotating shaft 101 into the inlet 119A that is of the fifth passageway 118A and that is on the second end plate 104 to enter the fifth passageway 118A, and the coolant is drained through the outlet 121A that is of the fifth passageway 118A and that is on the first end plate 103. The drained coolant may be recycled through a circulating loop. Specifically, the drained coolant may flow into the rotating shaft (101) through the circulating loop for recycling.

In this embodiment of this application, structures of the first end plate 103 and the second end plate 104 in the embodiment shown in FIG. 2 may be set to be the same, so as to implement a plurality of passageways, and bidirectional cross cooling is implemented in the plurality of passageways, so that the rotor is relatively desirably cooled. In addition, because the structures of the first end plate 103 and the second end plate 104 are the same, mold costs and production costs are relatively low and this is easy to implement.

In some embodiments, a position of the outlet 121 that is of the third passageway 118 and that is on the second end plate 104 and a position of the outlet 121A that is of the fifth passageway 118A and that is on the first end plate 103 may be separately opposite to positions of end windings 117 at two ends of the stator, so that the outlet 121 of the third passageway 118 may spray the coolant in the third passageway 118 onto surfaces of the end windings 117 at the two ends of the stator, or the outlet 121A of the fifth passageway 118A may spray the coolant in the fifth passageway 118A onto the surfaces of the end windings 117 at the two ends of the stator, so as to cool stator windings and reduce a copper loss density of motor windings. The coolant sprayed onto the surfaces of the end windings 117 of the stator may also be recycled through a circulating loop.

In some embodiments, a plurality of layers of holes may be provided on each of the plurality of lamination sheets 105. For example, in FIG. 4, a first-layer hole on each lamination sheet 105 includes at least one second through hole 120, a second-layer hole on each lamination sheet 105 includes at least one third through hole 124, and so on. The at least one second through hole 120 is configured to form the at least one third passageway 118, the at least one third through hole 124 is in communication to form the at least one fourth passageway 122, and so on.

Figure 4:
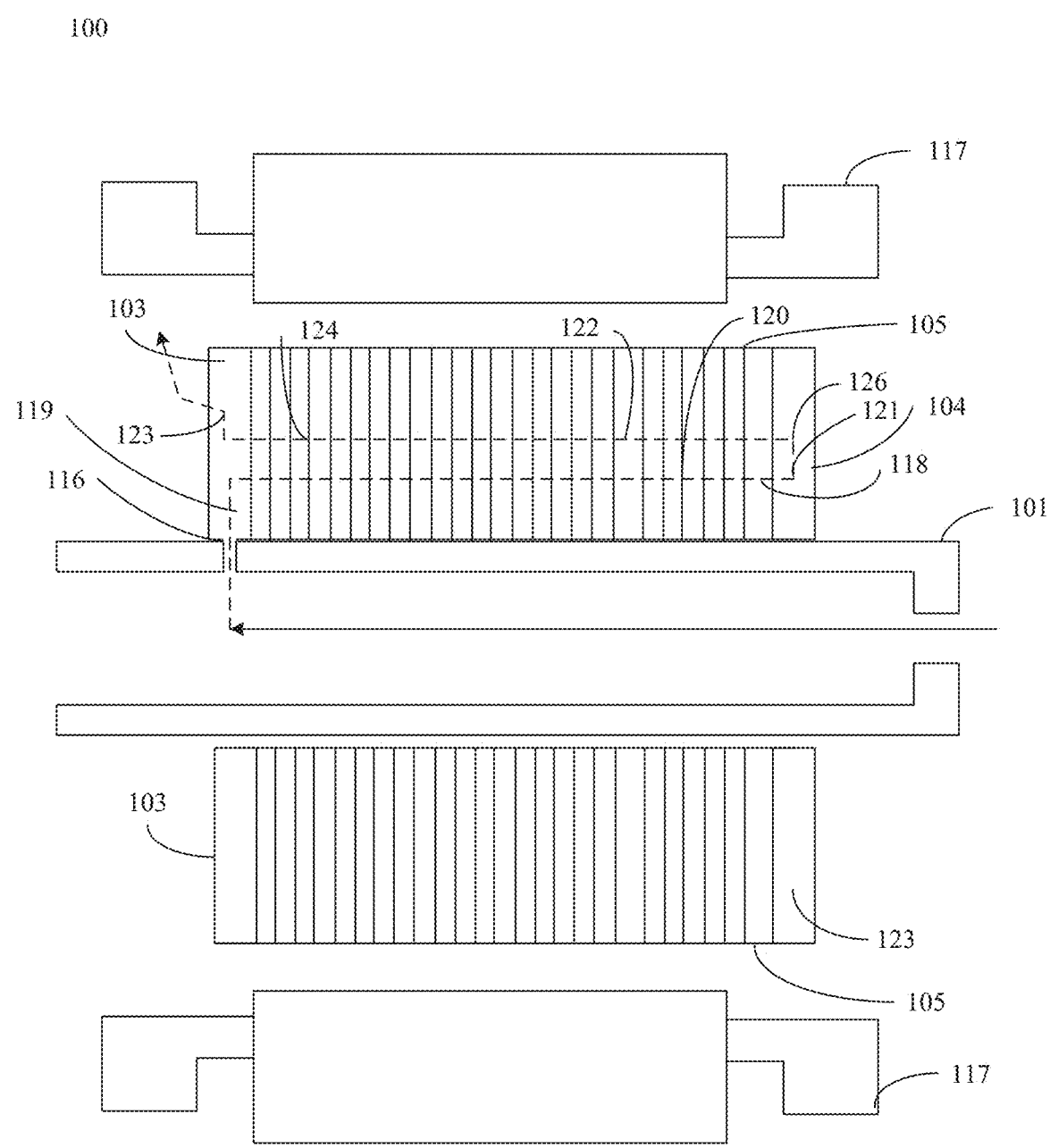
FIG. 4 is a schematic structural diagram of another rotor 100 of a motor according to an embodiment of this application.

As shown in FIG. 4, n inlets 119 of third passageways 118 may be provided on the first end plate 103, where n is a positive integer greater than or equal to 2. The coolant enters the at least one third passageway 118 and the at least one fourth passageway 122 through the at least one first liquid outlet 116 on the outer wall of the rotating shaft 101. The coolant may flow unidirectionally in the at least one third passageway 118 and the at least one fourth passageway 122, or may flow bidirectionally in the at least one third passageway 118 and the at least one fourth passageway 122.

In an embodiment, referring to FIG. 4, an inlet 126 of the at least one fourth passageway 122 is further provided on the second end plate 104. The inlet 126 of the at least one fourth passageway 122 is in communication with the outlet 121 that is of the at least one third passageway 118 and that is on the second end plate 104, so that the coolant of the at least one third passageway 118 flows into the at least one fourth passageway 122 through the outlet 121 of the at least one third passageway 118. The coolant enters the inlet 119 of the at least one third passageway 118 from the at least one first liquid outlet 116 on the outer wall of the rotating shaft 101, enters the at least one third passageway 118 through the inlet 119 of the at least one third passageway 118, enters, through the outlet 121 of the at least one third passageway 118, the inlet 126 of the at least one fourth passageway 122 in communication with the outlet 121 of the at least one third passageway 118, and enters the at least one fourth passageway 122. An outlet 123 of the at least one fourth passageway 122 is further provided on the first end plate 103, is in communication with the at least one fourth passageway 122, and is configured to drain the coolant from the at least one fourth passageway 122. The drained coolant may be recycled through a circulating loop. Specifically, the drained coolant may flow into the rotating shaft (101) through the circulating loop for recycling.

It should be noted that in this embodiment of this application, the inlet 126 that is of the fourth passageway 122 and that is on the second end plate 104 may alternatively be the same as the outlet 121 of the third passageway 118. To be specific, if the outlet 121 of the third passageway 118 is provided on the second end plate 104, the outlet 121 of the third passageway 118 may also serve as the inlet of the fourth passageway 122, or if the inlet 126 of the fourth passageway 122 is provided on the second end plate 104, the inlet 126 of the fourth passageway 122 may also serve as the outlet of the third passageway 118.

In another possible implementation, the inlet 119 of the at least one third passageway 118 and the outlet 123 of the at least one fourth passageway 122 on the first end plate 103 are separately in communication with the at least one first liquid outlet 116 on the outer wall of the rotating shaft 101, so that the coolant enters each of the inlet 119 of the at least one third passageway 118 and the outlet 123 of the at least one fourth passageway 122 from the at least one first liquid outlet 116 on the outer wall of the rotating shaft 101. On one hand, the coolant may enter the at least one fourth passageway 122 through the inlet 126 of the at least one fourth passageway 122, and is drained through the outlet 123 of the fourth passageway 122 in communication with the at least one fourth passageway 122. On the other hand, the coolant may enter the at least one third passageway 118 through the inlet 119 of the at least one third passageway 118, and is drained through the outlet 121 of the at least one third passageway 118 in communication with the at least one third passageway 118. The drained coolant may be recycled through a circulating loop. Specifically, the drained coolant may flow into the rotating shaft (101) through the circulating loop for recycling.

In one embodiment, a position of the outlet 123 that is of the fourth passageway 122 and that is on the first end plate 103 is opposite to the position of the end winding 117 of the stator, so that the outlet 123 of the fourth passageway 122 sprays the coolant in the fourth passageway 122 onto the surface of the end winding 117 of the stator. In this way, the coolant sprayed by the outlet 123 of the fourth passageway 122 cools a stator winding and reduces a copper loss density of a motor winding. The coolant sprayed onto the surface of the end winding 117 of the stator may also be recycled through a circulating loop.

In the embodiment shown in FIG. 4, structures of the first end plate 103 and the second end plate 104 may also be the same. For example, referring to FIG. 5, at least one fourth through hole 120A is further provided on each of the plurality of lamination sheets 105, and fourth through holes 120A on all of the plurality of lamination sheets 105 are stacked together to form at least one fifth passageway 118A. At least one fifth through hole 124A is further provided on each of the plurality of lamination sheets 105, and fifth through holes 124A on all of the plurality of lamination sheets 105 are stacked together to form at least one sixth passageway 122A.

The inlet 119A of the at least one fifth passageway 118A is further provided on the second end plate 104, and the outlet 121A of the at least one fifth passageway 118A is further provided on the first end plate 103. The inlet 119A of the at least one fifth passageway 118A and the outlet 121A of the at least one fifth passageway 118A are separately in communication with the at least one fifth passageway 118A. The inlet 119A that is of the at least one fifth passageway 118A and that is on the second end plate 104 may guide the coolant in the rotating shaft 101 into the at least one fifth passageway 118A through the at least one second liquid outlet 125 provided on the outer wall of the rotating shaft 101, and the coolant flows through the at least one fifth passageway 118A. An inlet 126A of the at least one sixth passageway 122A is further provided on the first end plate 103, and an outlet 123A of the at least one sixth passageway 122A is further provided on the second end plate 104. The inlet 126A of the at least one sixth passageway 122A is in communication with the outlet 121A that is of the at least one fifth passageway 118A and that is on the first end plate 103, so that the coolant in the at least one fifth passageway 118A flows into the at least one sixth passageway 122A through the outlet 121A of the at least one fifth passageway 118A. The outlet 123A that is of the at least one sixth passageway 122A and that is on the second end plate 104 is configured to drain the coolant from the at least one sixth passageway 122A. The drained coolant may be recycled through a circulating loop. Specifically, the drained coolant may flow into the rotating shaft (101) through the circulating loop for recycling.

It should be noted that in this embodiment of this application, the inlet 126A that is of the sixth passageway 122A and that is on the first end plate 103 may alternatively be the same as the outlet 121A of the fifth passageway 118A. To be specific, if the outlet 121A of the fifth passageway 118A is provided on the first end plate 103, the outlet 121A of the fifth passageway 118A may also serve as the inlet of the sixth passageway 122A, or if the inlet 126A of the sixth passageway 122A is provided on the first end plate 103, the inlet 126A of the sixth passageway 122A may also serve as the outlet of the fifth passageway 118A.

It should be further noted that, in the foregoing embodiment, a plurality of layers of holes may be provided on each of the plurality of lamination sheets 105. For ease of description, in FIG. 5, for example, two layers of holes are provided on each of the plurality of lamination sheets 105, a first-layer hole includes three second through holes 120 and three fourth through holes 120A, and a second-layer hole includes three third through holes 124 and three fifth through holes 124A.

Figure 5:
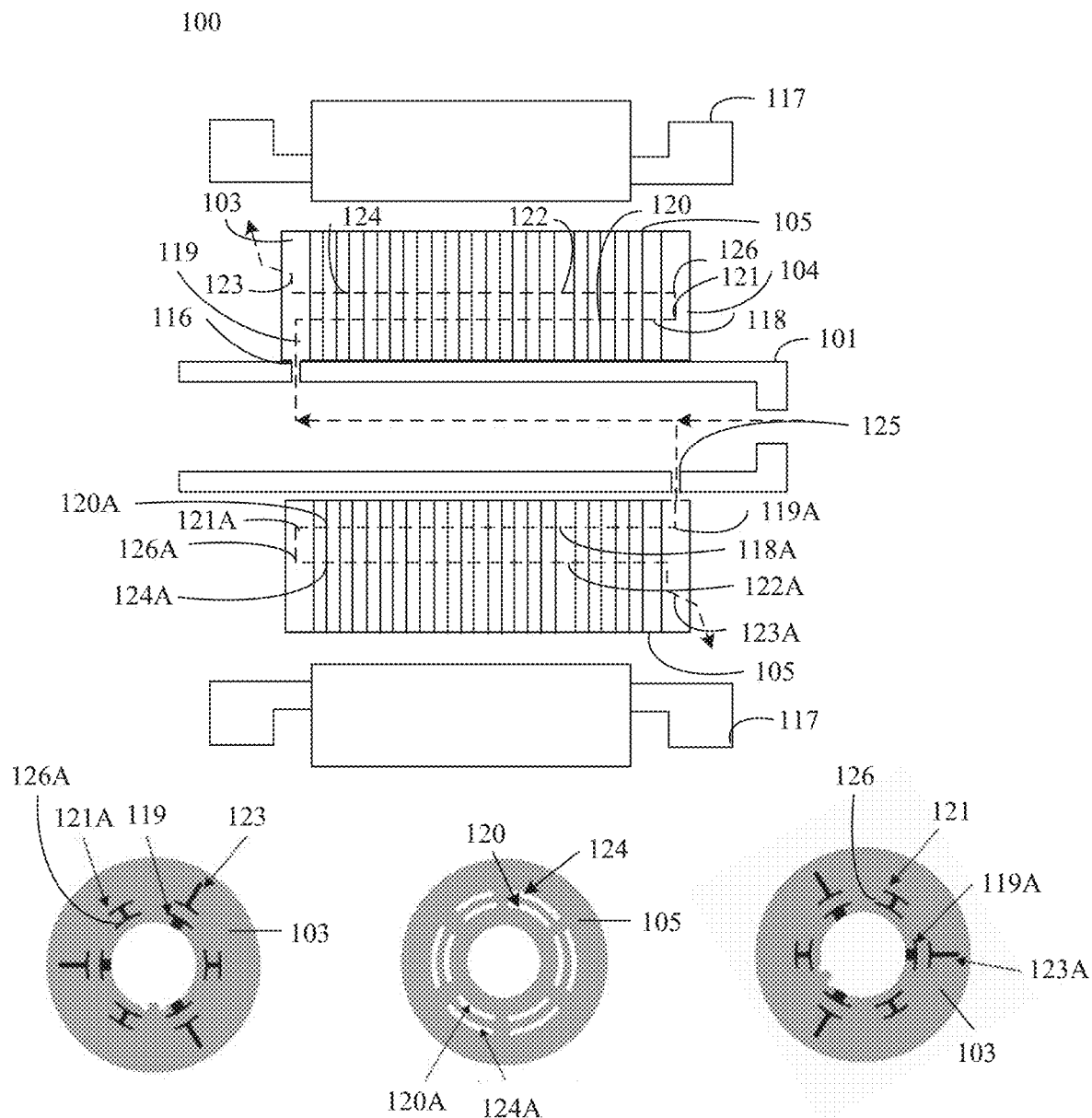
FIG. 5 is a schematic structural diagram of another rotor 100 of a motor according to an embodiment of this application.

Specifically, referring to FIG. 5, n inlets 119 may be provided on the first end plate 103, where n is a positive integer greater than or equal to 2. The coolant enters the at least one fifth passageway 118A and the at least one sixth passageway 122A through the at least one second liquid outlet 125 provided on the outer wall of the rotating shaft 101. The coolant may flow unidirectionally in the at least one fifth passageway 118A and the at least one sixth passageway 122A, or may flow bidirectionally in the at least one fifth passageway 118A and the at least one sixth passageway 122A.

For ease of description, in FIG. 5, for example, three inlets 119 of third passageways 118, three outlets 121A of fifth passageways 118A, three outlets 123 of fourth passageways 122, and three inlets 126A of sixth passageways 122A are provided on the first end plate 103. Structures of the second end plate 104 and the first end plate 103 are the same, and three inlets 119A of the fifth passageways 118A, three outlets 121 of the third passageways 118, three outlets 123A of the sixth passageways 122A, and three inlets 126 of the fourth passageways 122 are provided on the second end plate 104.

A relationship between positions of the three inlets 119 of the third passageways 118, a relationship between positions of the three outlets 121A of the fifth passageways 118A, a relationship between positions of the three outlets 123 of the fourth passageways 122, and a relationship between positions of the three inlets 126A of the sixth passageways 122A are not limited in this application, where the three inlets 119, the three outlets 121A, the three outlets 123, and the three inlets 126A are provided on the first end plate 103. Similarly, a relationship between positions of the three inlets 119A of the fifth passageways 118A, a relationship between positions of the three outlets 121 of the third passageways 118, a relationship between positions of the three outlets 123A of the sixth passageways 122A, and a relationship between positions of the three inlets 126 of the fourth passageways 122 are not limited, where the three inlets 119A, the three outlets 121, the three outlets 123A, and the three inlets 126 are provided on the second end plate 104. Preferably, the foregoing inlets and the foregoing outlets may be evenly distributed around the rotating shaft 101. For example, the three inlets 119 that are of the third passageways 118 and that are on the first end plate 103 are spaced by 120 degrees between each other. Similarly, the three outlets 121A of the fifth passageways 118A are also spaced by 120 degrees between each other, the three outlets 123 of the fourth passageways 122 are also spaced by 120 degrees between each other, and the three inlets 126A of the sixth passageways 122A are spaced by 120 degrees between each other. Structures of the second end plate 104 and the first end plate 103 are the same, and details are not described herein again. During mounting, the second end plate 104 may be rotated by 360/n=360/6=60 degrees to mount the second end plate 104 in a mirroring manner relative to the first end plate 103. Alternatively, the first end plate 103 may be rotated by 360/n=360/6=60 degrees to mount the first end plate 103 in a mirroring manner relative to the second end plate 104.

In FIG. 5, the coolant may enter the rotating shaft 101. On one hand, the first liquid outlet 116 disposed on the outer wall of the rotating shaft 101 may guide the coolant in the rotating shaft 101 into the inlet 119 that is of the third passageway 118 and that is on the first end plate 103. The coolant enters the third passageway 118 through the inlet 119 that is of the third passageway 118 and that is on the first end plate 103, flows into the fourth passageway 122 through the inlet (126) of the fourth passageway 122 in communication with the outlet 121 that is of the third passageway 118 and that is on the second end plate 104, and then is drained through the outlet 123 that is of the fourth passageway 122 and that is on the first end plate 103. On the other hand, the second liquid outlet 125 provided on the outer wall of the rotating shaft 101 may further guide the coolant in the rotating shaft 101 into the inlet 119A that is of the fifth passageway 118A and that is on the second end plate 104. The coolant enters the fifth passageway 118A through the inlet 119A that is of the fifth passageway 118A and that is on the second end plate 104, flows into the sixth passageway 122A through the inlet (126A) that is of the sixth passageway 122A and is on the first end plate 103 and that is in communication with the outlet 121A of the fifth passageway 118A, and is drained through the outlet 123A that is of the sixth passageway 122A and that is on the second end plate 104. The drained coolant may be recycled through a circulating loop. Specifically, the drained coolant may flow into the rotating shaft (101) through the circulating loop for recycling.

In the foregoing solution, a plurality of layers of passageways may be implemented in the plurality of lamination sheets, so that coolant in the plurality of layers of passageways cools the lamination sheets, and a cooling effect is relatively desirable.

In some embodiments, on one hand, convection and heat exchange of a surface of the inner wall of the rotating shaft of the rotor and the coolant may be performed, so as to cool the rotor. Because a hot area of the rotor is usually located at an axial center portion of the rotor, coolant needs to be preferably transported to a corresponding specific area within the rotating shaft of the rotor. On the other hand, under rotational movement of the rotor, the rotor may further spray the coolant onto end windings on two sides of the stator of the motor, to cool stator windings. In this manner, coolant that enters the rotor needs to be stably and effectively distributed to two ends of the rotor in the rotor.

Rotational speeds of the rotor and flows of coolant have wide ranges, and different rotational speeds of the rotor and different flows of the coolant affect flow distribution of the coolant. Therefore, in this embodiment of this application, to transport coolant to a specific area in a cavity of the rotating shaft of the rotor and stably distribute flows to two ends of the rotor, a flow distribution apparatus is provided, so that coolant that enters the rotating shaft can be effectively transported to a specific axial position of the rotating shaft, and then flows of the coolant are stably distributed to the two ends of the rotor under a centrifugal force of the rotating shaft. This resolves a problem of cooling rotor and stator windings of the motor, especially a problem of an overtemperature of a stator winding and a rotor magnet steel of a powertrain of an electric vehicle in a specific working condition.

Figure 6:
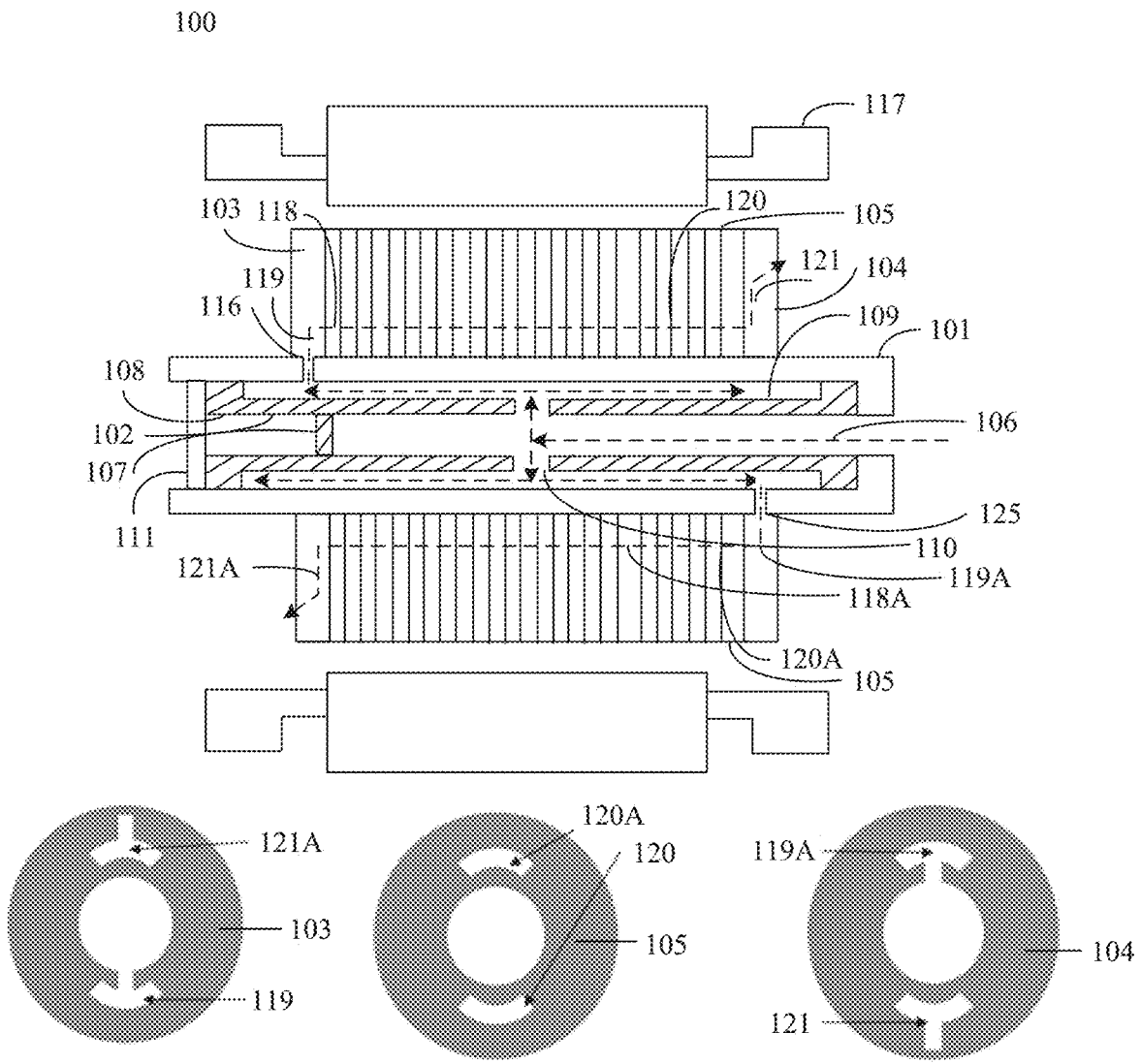
FIG. 6 is a schematic structural diagram of another rotor 100 of a motor according to an embodiment of this application.

The following describes in detail another rotor of a motor according to an embodiment of this application with reference to FIG. 6.

FIG. 6 is a schematic structural diagram of a rotor 100 of a motor according to an embodiment of this application. As shown in FIG. 6, the rotor 100 of the motor may include: a rotating shaft 101, a flow distribution apparatus 102, a first end plate 103, a second end plate 104, and a plurality of lamination sheets 105.

The flow distribution apparatus 102 is shown in shaded slash portions in FIG. 6. The flow distribution apparatus 102 is embedded in an inner cavity of the rotating shaft 101 and moves along with the rotating shaft 101. Specifically, the flow distribution apparatus 102 is a hollow structure. A shape of the flow distribution apparatus 102 is not limited in this embodiment of this application. For example, the flow distribution apparatus 102 may be a hollow cylinder. For another example, the flow distribution apparatus 102 may be another three-dimensional hollow structure.

The flow distribution apparatus 102 is fastened onto an inner wall of the rotating shaft 101. Specifically, fastening components 108 are disposed at two ends of an outer wall that is of the flow distribution apparatus 102 and that is along an axial direction of the rotating shaft 101, so that the flow distribution apparatus 102 is fastened onto two inner side walls of the inner cavity of the rotating shaft 101 by using the fastening components 108 at the two ends of the outer wall of the flow distribution apparatus 102.

At least one first through hole 110 is provided axially on the outer wall of the flow distribution apparatus 102. The at least one first through hole 110 is in communication with each of a first passageway 106 and a second passageway 109, and is configured to connect the first passageway 106 and the second passageway 109. A specific position of the at least one first through hole 110 provided on the flow distribution apparatus 102 is not limited in this embodiment of this application. A perforation position of the at least one first through hole 110 on a wall surface of a hollow shaft structure of the flow distribution apparatus 102 may be adjusted, so as to effectively transport the coolant to a specific axial position of the rotating shaft 101.

The second passageway 109 is formed between the outer wall of the flow distribution apparatus 102 and the inner wall of the rotating shaft 101. An opening is provided at an end that is of the flow distribution apparatus 102 and that is fastened onto the inner wall of the rotating shaft 101, and the first passageway 106 is formed between the opening and the at least one first through hole 110. A baffle plate (107) is disposed between the at least one first through hole (110) in the flow distribution apparatus 102 and an end opposite to the first passageway (106), and the baffle plate 107 is configured to prevent the coolant in the first passageway 106 from flowing out of the flow distribution apparatus 102. In an embodiment, the baffle plate (107) is located at an end that is of the flow distribution apparatus (102) and that is opposite to the first passageway (106).

Specific shapes of the fastening components 108 at the two ends of the outer wall that is of the flow distribution apparatus 102 and that is along the axial direction of the rotating shaft 101 are not limited in this embodiment of this application, provided that the two ends of the outer wall of the flow distribution apparatus 102 and the two inner side walls of the inner cavity of the rotating shaft 101 can be fastened or sealed.

In an embodiment, the fastening components 108 are annular protrusions at the two ends of the outer wall of the flow distribution apparatus 102. Outer wall surfaces of the annular protrusions and a wall surface of the inner cavity of the rotating shaft 101 use an interference fit, so that the two ends of the outer wall of the flow distribution apparatus 102 and two ends of the wall surface of the inner cavity of the rotating shaft 101 are sealed and fastened axially.

In an embodiment, the fastening components 108 are annular protrusions and sealing rings at the two ends of the outer wall of the flow distribution apparatus 102. For example, referring to FIG. 7, grooves are provided in annular protrusions 108 at the two ends of the outer wall of the flow distribution apparatus 102, and sealing rings 113 are disposed in the grooves. Outer wall surfaces of the annular protrusions 108 and the sealing rings 113 in the grooves and a wall surface of the inner cavity of the rotating shaft 101 use an interference fit, so that the two ends of the outer wall of the flow distribution apparatus 102 and two ends of the wall surface of the inner cavity of the rotating shaft 101 are sealed and fastened axially.

In an embodiment, an inner diameter, an outer diameter, and a wall thickness of the flow distribution apparatus 102 are not limited, and radial space sizes of the first passageway 106 and/or the second passageway 109 may be adjusted based on an actual requirement. For example, the radial space size of the first passageway 106 may be increased to increase a flow of coolant that enters the rotating shaft 101. For example, the radial space size of the second passageway 109 may be further reduced to increase a coverage area between the coolant that enters the rotating shaft 101 and an inner wall surface of the rotating shaft 101, enhance convection and heat exchange of the rotating shaft 101, and better cool the rotating shaft 101.

In an embodiment, the coolant may enter the first passageway 106 from a coolant inlet channel, and enters the second passageway 109 through the at least one first through hole 110 provided axially on the outer wall of the flow distribution apparatus 102. The coolant that enters the rotating shaft 101 may be transported to a specific axial position of the rotating shaft 101, so as to stably distribute flows of the coolant to two ends of the rotor 100 under a centrifugal force of the rotating shaft 101, thereby resolving a problem of cooling the rotor of the motor.

In an embodiment, the at least one first through hole 110 provided axially on the outer wall of the flow distribution apparatus 102 may be evenly distributed around the rotating shaft 101.

In some embodiments, an axial fastening part 111 is disposed at another end that is of the rotating shaft 101 and that is opposite to the end at which the opening is provided and the first passageway 106 is formed, so as to axially fasten the flow distribution apparatus 102 located in the rotating shaft 101.

The fastening part 111 is not limited in this embodiment of this application, provided that the coolant that enters the flow distribution apparatus 102 can be prevented from flowing out. In an embodiment, the fastening part 111 may be a baffle plate.

A material of the flow distribution apparatus 102 is not limited in this embodiment of this application. The flow distribution apparatus 102 may be a plastic material, or may be a metal material, or may be another material. In this embodiment of this application, the flow distribution apparatus 102 may be processed with a mold, so that production costs are low.

It should be noted that the coolant that enters the first passageway 106 and the second passageway 109 is not limited in this embodiment of this application, and may be water, or may be oil, or may be another chemical solution for cooling.

In some embodiments, heights of the fastening components 108 disposed at the two ends of the outer wall that is of the flow distribution apparatus 102 and that is along the axial direction of the rotating shaft 101 may be further adjusted, so as to adjust a distance between the inner wall of the rotating shaft 101 and the outer wall of the flow distribution apparatus 102, to adjust a proportion of coolant that enters two ends of the rotating shaft 101 in the second passageway 109.

In some embodiments, a reinforcing component may be further disposed on a surface of the outer wall of the flow distribution apparatus 102. The reinforcing component may be configured to connect to the flow distribution apparatus 102 at two ends of the at least one first through hole 110, to provide support between the outer wall of the flow distribution apparatus 102 and the inner wall of the rotating shaft 101, and may be configured to resolve a problem of damage caused by insufficient structural strength of the flow distribution apparatus 102 when the rotor 100 rotates at a high speed.

Figure 7:
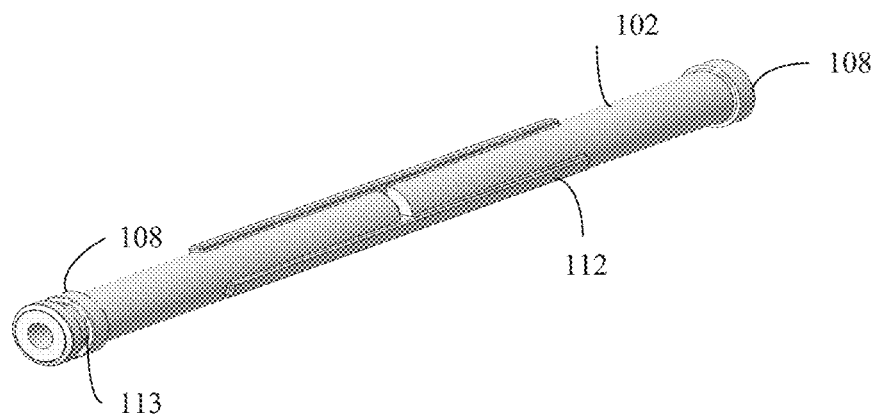
FIG. 7 is a schematic structural diagram of a flow distribution apparatus 102 according to an embodiment of this application.

In an embodiment, the reinforcing component may be a stiffener 112 shown in FIG. 7, and the stiffener 112 may be, for example, a long-strip-shaped protrusion axially disposed on the flow distribution apparatus 102. Specifically, a direction of the long-strip-shaped protrusion may be parallel to an axial direction of the rotating shaft 101, or may be at a specific angle to the axial direction of the rotating shaft 101. This is not limited in this application. In FIG. 7, an example in which the stiffener 112 is parallel to the axial direction of the rotating shaft 101 is used for description.

It should be noted that, as shown in FIG. 7, the grooves are provided on the annular protrusions 108 on two sides of the outer wall of the flow distribution apparatus 102, and the sealing rings 113 are disposed in the grooves. The outer wall surfaces of the annular protrusions and the sealing rings 113 in the grooves and the wall surface of the inner cavity of the rotating shaft 101 use an interference fit, so that the flow distribution apparatus 102 and the wall surface of the inner cavity of the rotating shaft 101 are sealed and fastened axially.

Figure 8:
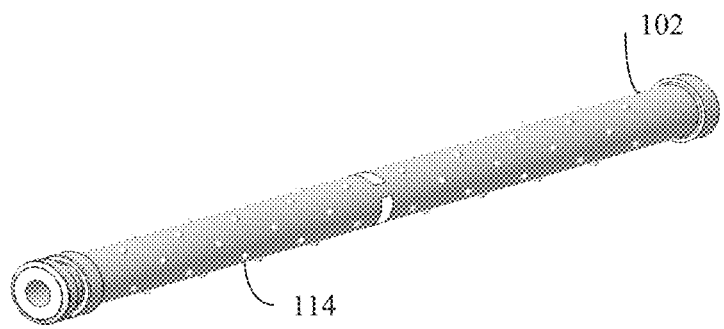
FIG. 8 is a schematic structural diagram of another flow distribution apparatus 102 according to an embodiment of this application.

In some embodiments, a flow disturbing component may be further disposed on the surface of the outer wall of the flow distribution apparatus 102, to enhance convection and heat exchange of the coolant in the second passageway 109 and the wall surface of the inner cavity of the rotating shaft 101, and improve a cooling capability of the rotor. In addition, the flow disturbing component may further strengthen and support the flow distribution apparatus 102. For example, in an embodiment, as shown in FIG. 8, the flow disturbing component disposed on the surface of the outer wall of the flow distribution apparatus 102 is at least one protrusion 114. The at least one protrusion 114 can enhance convection and heat exchange of the coolant in the second passageway 109 and the wall surface of the inner cavity of the rotating shaft 101, and improve the cooling capability of the rotor.

A shape of the at least one protrusion 114 in FIG. 8 is not limited in this embodiment of this application, and may be a spherical protrusion or a protrusion of another shape. In FIG. 8, an example in which the protrusion 114 is a spherical protrusion is used for description.

Figure 9:
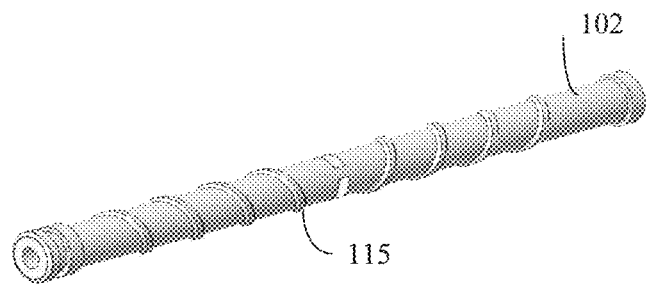
FIG. 9 is a schematic structural diagram of another flow distribution apparatus 102 according to an embodiment of this application.

In some embodiments, a pressurizing structure may be further disposed on the surface of the outer wall of the flow distribution apparatus 102. When the rotating shaft 101 rotates, the pressurizing structure on the flow distribution apparatus 102 is driven to rotate, to generate a pumping effect on the coolant in the second passageway 109. In addition, the pressurizing structure may further perform a flow disturbing function, enhance convection and heat exchange of the coolant in the second passageway 109 and the wall surface of the inner cavity of the rotating shaft 101, and improve a cooling capability of the rotor. In addition, the pressurizing structure further strengthens and supports the flow distribution apparatus 102. For example, in an embodiment, as shown in FIG. 9, the pressurizing structure is a helical structure 115 disposed on the surface of the outer wall of the flow distribution apparatus 102. When the rotating shaft 101 rotates, the helical structure 115 is driven to rotate, to generate a pumping effect on the coolant in the second passageway 109. In addition, the helical structure 115 may further enhance convection and heat exchange of the coolant in the second passageway 109 and the wall surface of the inner cavity of the rotating shaft 101, and strengthen and support the flow distribution apparatus 102.

In some embodiments, the at least one protrusion 114 on the surface of the outer wall of the flow distribution apparatus 102 shown in FIG. 8 may be further arranged in a helical shape shown in FIG. 9.

The flow distribution apparatus in the cavity of the rotating shaft of the rotor of the motor provided in this embodiment of this application has a simple structure and is highly universal, can be flexibly adjusted in size, and has no special processing requirement on the rotating shaft. On one hand, the flow distribution apparatus can enhance the cooling capability of the rotor and has a relatively desirable cooling effect. On the other hand, the flow distribution apparatus may be injection molded with a mold and is cost-effective.

The flow distribution apparatus 102 in the rotating shaft 101 is described above, and the following describes a specific implementation in which the coolant enters the flow distribution apparatus 102 in the rotating shaft 101 and enters the first end plate 103 and/or the second end plate 104 through the flow distribution apparatus 102 in FIG. 6.

It should be noted that, the flow distribution apparatus 102 in the rotating shaft 101 that the coolant enters, the first end plate 103 and/or the second end plate 104 that the coolant enters through the flow distribution apparatus 102, and the plurality of lamination sheets 105 located between the first end plate 103 and the second end plate 104 may be any structure in FIG. 2 to FIG. 5.

For ease of description, in FIG. 6, structures of the first end plate 103, the second end plate 104, and the plurality of lamination sheets 105 in FIG. 3 are described.

Referring to FIG. 6, on one hand, the coolant in the second passageway 109 flows into the inlet 119 that is of the third passageway 118 and that is on the first end plate 103 through the first liquid outlet 116 provided on the outer wall of the rotating shaft 101, enters the third passageway 118 through the inlet 119 that is of the third passageway 118 and that is on the first end plate 103, and is drained through the outlet 121 that is of the third passageway 118 and that is on the second end plate 104. On the other hand, the coolant in the second passageway 109 flows into the inlet 119A that is of the fifth passageway 118A and that is on the second end plate 104 through the second liquid outlet 125 provided on the outer wall of the rotating shaft 101, enters the fifth passageway 118A, and is drained through the outlet 121A that is of the fifth passageway 118A and that is on the first end plate 103. The drained coolant may be recycled through a circulating loop. Specifically, the drained coolant may flow into the rotating shaft (101) through the circulating loop for recycling.

A position of the outlet 121 that is of the third passageway 118 and that is on the second end plate 104 and a position of the outlet 121A that is of the fifth passageway 118A and that is on the first end plate 103 may be separately opposite to positions of end windings 117 at two ends of a stator, so that the outlet 121 of the third passageway 118 may spray the coolant in the third passageway 118 onto surfaces of the end windings 117 at the two ends of the stator, or the outlet 121A of the fifth passageway 118A may spray the coolant in the fifth passageway 118A onto the surfaces of the end windings 117 at the two ends of the stator, so as to cool stator windings and reduce a copper loss density of motor windings.

An embodiment of this application further provides a motor, including a stator of the motor and a rotor of the motor. The rotor of the motor may be any one of the rotors mentioned above, to cool a stator winding of the motor and reduce a copper loss density of a motor winding. For a specific description of the rotor of the motor, refer to the foregoing descriptions. Details are not described herein again.

An embodiment of this application further provides a powertrain, including a motor. The powertrain may further include an electric drive and a decelerator. For details, refer to the foregoing descriptions. Details are not described herein again.

An embodiment of this application further provides an automobile, including one or more powertrains. The automobile may further include a battery pack and wheels.

In this application, "at least one" means one or more, and "a plurality of" means two or more. "At least one item (piece) of the following" or a similar expression thereof means any combination of these items, including a singular item (piece) or any combination of plural items (pieces). For example, at least one item (piece) of a, b, or c may represent: a, b, c, a and b, a and c, b and c, or a, b, and c, where a, b, and c may be singular or plural.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A rotor of a motor, comprising:
   a rotating shaft, provided with at least one first liquid outlet, wherein the rotating shaft comprises a bore extending through the complete rotating shaft;
   a first end plate, disposed on an outer wall of the rotating shaft and perpendicular to the rotating shaft, wherein a liquid inlet of at least one third passageway is provided on the first end plate, and in flow connection with the at least one first liquid outlet of the rotating shaft;
   a second end plate, disposed on the outer wall of the rotating shaft and perpendicular to the rotating shaft, wherein a second liquid outlet of the at least one third passageway is provided on the second end plate and is configured to drain coolant from the at least one third passageway, wherein the coolant enters the at least one third passageway through the at least one first liquid outlet of the rotating shaft and is drained through the second liquid outlet of the at least one third passageway;
   a plurality of lamination sheets, disposed between the first end plate and the second end plate, wherein at least one second through hole is provided on each of the plurality of lamination sheets, and forms the at least one third passageway;
   a flow distribution apparatus, having a hollow structure and located in the bore of the rotating shaft, wherein fastening components are disposed at two ends of an outer wall of the flow distribution apparatus, wherein the flow distribution apparatus is connected to two ends of an inner wall of the rotating shaft by using the fastening components;
   wherein at least one first through hole is provided on a side wall of the flow distribution apparatus;
   wherein a first passageway is formed between an opening at one end of the flow distribution apparatus and the at least one first through hole;

wherein a baffle plate is disposed between the at least one first through hole in the flow distribution apparatus and an end opposite to the first passageway;

wherein a second passageway is formed between the outer wall of the flow distribution apparatus and the inner wall of the rotating shaft, and the at least one first through hole is configured to connect the first passageway to the second passageway; and wherein the at least one first liquid outlet of the rotating shaft is in flow connection to a liquid inlet of the bore at an axial end of the rotating shaft via the second passageway, the at least one through hole, and the first passageway.

2. The rotor of the motor according to claim 1, wherein the at least one first liquid outlet of the rotating shaft is in communication with the second passageway and is configured to drain coolant from the second passageway; and wherein coolant flows into the second passageway through the first passageway on the rotating shaft and flows into the at least one third passageway through the at least one first liquid outlet.

3. The rotor of the motor according to claim 1, wherein the fastening components are annular protrusions.

4. The rotor of the motor according to claim 3, wherein the fastening components further comprise sealing rings.

5. The rotor of the motor according to claim 1, wherein a reinforcing component is disposed on the outer wall of the flow distribution apparatus, and is configured to connect to outer walls that are on two sides of the at least one first through hole that is on the flow distribution apparatus.

6. The rotor of the motor according to claim 5, wherein the reinforcing component is a long-strip-shaped protrusion.

7. The rotor of the motor according to claim 1, wherein a flow disturbing component is further disposed on the outer wall of the flow distribution apparatus.

8. The rotor of the motor according to claim 7, wherein the flow disturbing component is a spherical protrusion.

9. The rotor of the motor according to claim 7, wherein the flow disturbing component is in a helical shape.

10. The rotor of the motor according to claim 1, wherein the baffle plate is located at an end that is of the flow distribution apparatus and that is opposite to the first passageway.

* * * * *